(12) United States Patent
Min et al.

(10) Patent No.: US 8,204,154 B2
(45) Date of Patent: Jun. 19, 2012

(54) DC OFFSET CALIBRATION

(75) Inventors: ByungWook Min, Austin, TX (US);
Chan Hong Park, Santa Clara, CA (US)

(73) Assignee: Qualcomm Incorporated, San Diego, CA (US)

( * ) Notice: Subject to any disclaimer, the term of this patent is extended or adjusted under 35 U.S.C. 154(b) by 132 days.

(21) Appl. No.: 12/783,012

(22) Filed: May 19, 2010

(65) Prior Publication Data

US 2011/0286553 A1  Nov. 24, 2011

(51) Int. Cl.
*H04L 25/06* (2006.01)
*H04L 25/10* (2006.01)

(52) U.S. Cl. ............. 375/319; 375/349; 331/46; 331/51

(58) Field of Classification Search .................. 375/319, 375/349, 371, 375; 331/46, 51
See application file for complete search history.

(56) References Cited

U.S. PATENT DOCUMENTS 6,148,047 A * 11/2000 Mohindra .................. 375/346
2009/0016376 A1   1/2009 Sawai

OTHER PUBLICATIONS

International Search Report and Written Opinion—PCT/US2011/037205—ISA/EPO—Aug. 30, 2011.

* cited by examiner

*Primary Examiner* — Curtis Odom
(74) *Attorney, Agent, or Firm* — Eric Ho

(57) ABSTRACT

A mobile communication device comprises a plurality of receivers, a phase detection circuit, and a DC offset calibration circuit. Each receiver comprises a receiver chain and a divide-by-2 circuit that supplies Local Oscillating (LO) signal for the receiver chain. The LO signals leak to each receiver chain and create an undesirable DC offset voltage. The DC offset depends on an LNA gain and a phase relation among the LO leakages. In a first novel aspect, a two-dimensional DC offset calibration (DCOC) table is prepared for each receiver chain. In a second novel aspect, the phase detection circuit detects the phase relation among the LO leakages for each receiver chain. Based on the LNA gain and the detected phase relation of each receiver chain, a DCOC code is selected from a corresponding DCOC table such that the calibration circuit calibrates the DC offset for each receiver effectively and efficiently.

28 Claims, 6 Drawing Sheets

BIMODAL BEHAVIOR OF A DIVIDER-BY-2 CIRCUIT

FOUR POSSIBLE LO LEAKAGE PHASE RELATIONS AND DC OFFSET

| ΣLO-LEAK / LNA GAIN | PHASE RELATION (A) | PHASE RELATION (B) | PHASE RELATION (C) | PHASE RELATION (D) |
|---|---|---|---|---|
| LNA G0 | DCOC (I/Q) | DCOC (I/Q) | DCOC (I/Q) | DCOC (I/Q) |
| LNA G1 | DCOC (I/Q) | DCOC (I/Q) | DCOC (I/Q) | DCOC (I/Q) |
| LNA G2 | DCOC (I/Q) | DCOC (I/Q) | DCOC (I/Q) | DCOC (I/Q) |
| LNA G3 | DCOC (I/Q) | DCOC (I/Q) | DCOC (I/Q) | DCOC (I/Q) |
FIG. 6
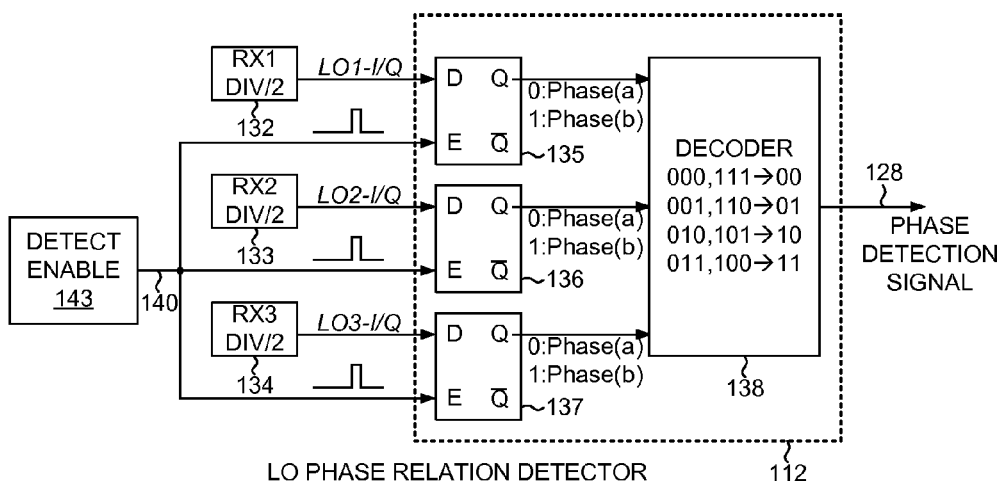
LO PHASE RELATION DETECTOR
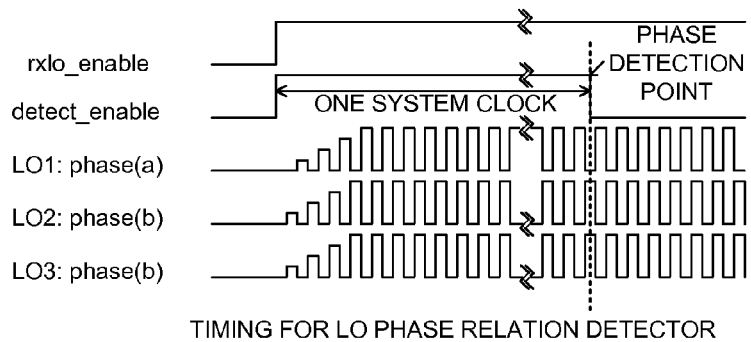
TIMING FOR LO PHASE RELATION DETECTOR
FIG. 7

DC OFFSET CALIBRATION

BACKGROUND INFORMATION

1. Technical Field

The disclosed embodiments relate to receiver DC offset calibration, and more particularly, to DC offset calibration in multiple-input multiple-output (MIMO) applications using a DC offset calibration table.

2. Background Information

FIG. 1 (Prior Art) is a simplified block diagram of a radio frequency (RF) transceiver integrated circuit 11. RF transceiver integrated circuit 11 comprises a transmitter as well as a plurality of receivers. Each receiver includes a "receiver chain" (i.e., RX1, RX2, and RX3) as well as a local oscillator (LO) that supplies LO signals onto the receiver chain. For example, in receiving mode, a high frequency RF signal 14 is received on antenna 13. Information from signal 14 passes through matching network 15 and through a receiver chain 12 (RX1). Signal 14 is amplified by Low Noise Amplifier (LNA) 16 and is down-converted in frequency by mixer 17. The resulting down-converted signal is amplified by transimpedance amplifier (TIA) 18, filtered by baseband filter (BBF) 19, and then passed to a digital baseband integrated circuit (not shown) for digital processing.

In a zero- or low-intermediate frequency (IF) system, any DC offset of a receiver chain is calibrated to ensure proper signal reception and processing. The DC offset is generally caused by the mismatch of different circuits of the receiver (i.e., TIA, BBF etc.), and also by LO leakages to the receiver front end. In the example of FIG. 1, LO signals (i.e., LO-I and LO-Q) are provided by a phase-lock-loop (PLL) block and a plurality of divide-by-2 circuits to the mixer in each receiver chain. The LO signals, however, leak onto the input of the LNA of each receiver. The LO leakages are then mixed with the original LO signals at the mixer and fall into a DC offset voltage. In multiple-input multiple-output (MIMO) or multiple-input single-output (MISO) systems, LO leakages come from multiple divide-by-2 circuits or the PLL block for multiple receiver chains. Efficient and accurate DC offset calibration remains a challenge in MIMO/MISO systems.

SUMMARY

A mobile communication device comprises a plurality of receivers, a phase detection circuit, and a DC offset calibration circuit. Each receiver comprises a receiver chain and a local oscillator (LO) that supplies LO signals for the receiver chain. The LO signals leak to the front end of each receiver chain and cause an undesirable DC offset voltage for each receiver chain. Because the mobile communication device comprises multiple LOs supplying LO signals for multiple receiver chains, the LO leakages come from all the LOs. As a result, the final LO leakage level causing the DC offset is the vector summation of all the LO leakages from each LO. In addition, because the final LO leakage level is normally amplified by a low-noise amplifier (LNA) in each receiver chain, the DC offset also depends on the LNA gain setting of each receiver chain.

In MIMO/MISO applications, the receivers are frequently powered-on in receiving mode and powered-off in transmitting mode to save power consumption. Because of the bimodal behavior of the LO leakages, the phase relations among the LO leakages after each power-on of the receivers are unpredictable. The phase relations in turn determines the final LO leakage level for each receiver chain. In a first novel aspect, a two-dimensional DC offset calibration (DCOC) table is prepared for each receiver chain after each power-on. Each DCOC table contains DCOC codes for different LNA gain settings and different phase relations among the LO leakages for each receiver chain. In a second novel aspect, the phase detection circuit quickly detects the phase relation among the LO leakages for each receiver chain after each power-on. Based on the LNA gain and the detected phase relation of each receiver chain, a DCOC code is selected from a corresponding DCOC table such that the calibration circuit is able to calibrate the DC offset for each receiver chain effectively and efficiently.

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

BRIEF DESCRIPTION OF THE DRAWINGS

FIG. 6 is a DC offset calibration (DCOC) table used for DC offset calibration in a mobile communication device.

FIG. 7 is a circuit and timing diagram of a phase detection circuit in a mobile communication device.

DETAILED DESCRIPTION

Figure 1:
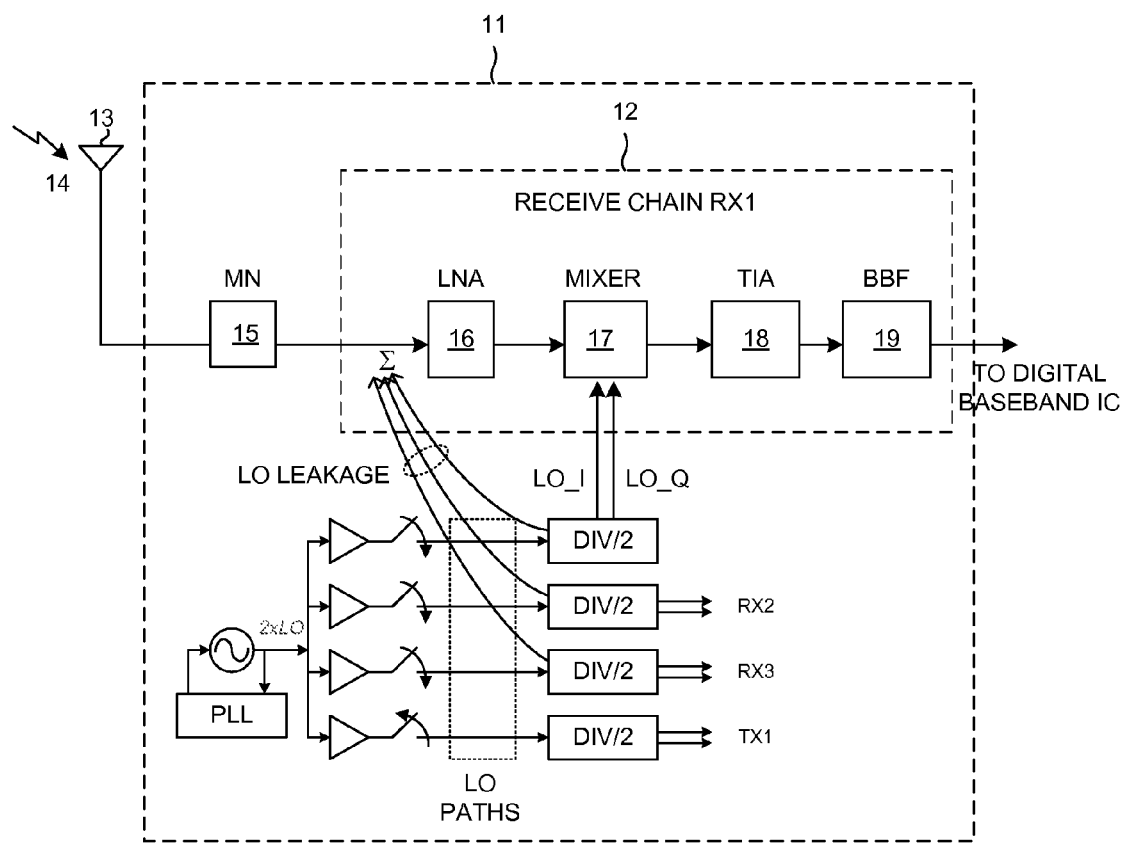
FIG. 1 (Prior Art) is a simplified block diagram of a RF transceiver integrated circuit.
Figure 2:
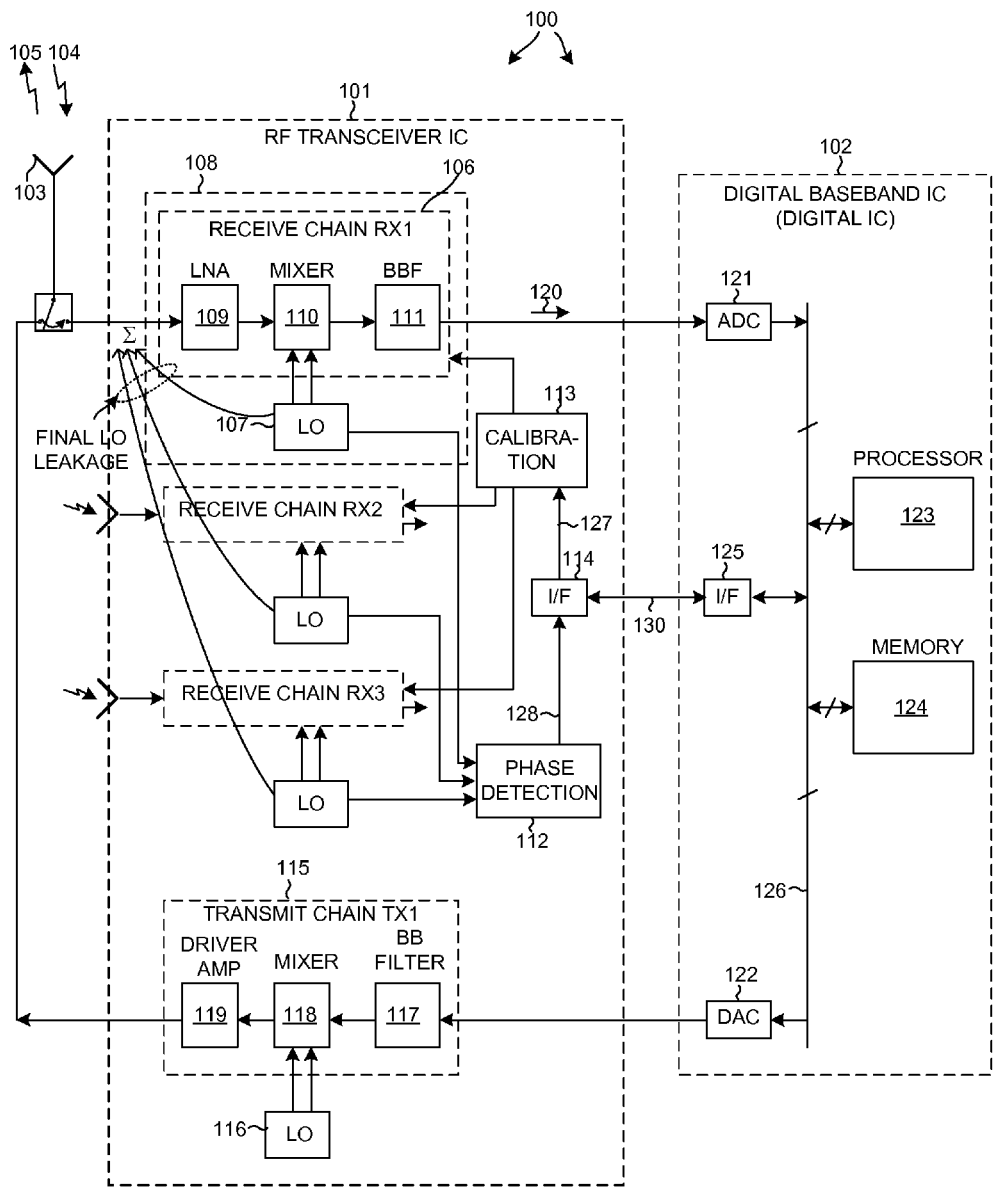
FIG. 2 is a simplified high level block diagram of one particular type of a mobile communication device in accordance with one novel aspect.

FIG. 2 is a simplified high level block diagram of one particular type of mobile communication device 100 in accordance with one novel aspect. Mobile communication device 100 includes (among several other parts not illustrated) two integrated circuits 101 and 102. Integrated circuit 101 is called an "RF transceiver integrated circuit". For multiple-input multiple-output (MIMO) or multiple-input single-output (MISO) mobile communication, an RF transceiver integrated circuit includes multiple receivers and one or more transmitters. Each receiver or transmitter includes what is called a "receiver chain" or "transmitter chain" as well as a Local Oscillator (LO). In the example of FIG. 2, RF transceiver integrated circuit 101 includes three receiver chains RX1, RX2, and RX3, and one transmitter chain TX1. Each receiver chain and transmitter chain is supplied with oscillating signals generated by a corresponding local oscillator. RF transceiver integrated circuit 101 also includes a phase detection circuit 112, a DC offset calibration circuit 113, and a bus interface (I/F) 114. On the other hand, integrated circuit 102 is called a "digital baseband integrated circuit" or a "baseband processor integrated circuit". Digital baseband integrated circuit 102 includes an analog-to-digital converter (ADC) 121, a digital-to-analog converter (DAC) 122, a processor 123, memory 124, a bus interface (I/F) 125, and a digital bus 126 that interconnects different components inside the digital baseband integrated circuit 102. In addition, RF transceiver integrated circuit 101 and digital baseband integrated circuit 102 communicate control information across a digital bus 130 through bus interface 114 and bus interface 125.

When mobile communication device 100 is receiving, a high frequency RF signal 104 is received on antenna 103. Information from signal 104 passes through a first receiver chain 106 (RX1) of a first receiver 108. RX1 includes a Low Noise Amplifier (LNA) 109, a mixer block 110, and a baseband filer (BBF) block 111. Signal 104 is amplified by LNA 109 and is down-converted in frequency by mixer block 110 under control of local oscillator 107. The resulting down-converted signal is filtered by BBF 111 and is then passed to the digital baseband integrated circuit 102. ADC 121 in the digital baseband integrated circuit 102 converts the signal into digital form, and the resulting digital information is processed by digital circuitry in the digital baseband integrated circuit 102. For MIMO/MISO mobile communication, RF signals are received on one of the multiple antennas, pass through one of the multiple receiver chains RX1, RX2 or RX3, and then are processed by the digital baseband integrated circuit 102.

If mobile communication device 100 is transmitting, then information to be transmitted is converted from digital form into analog form by DAC 122 in the digital baseband integrated circuit 102 and is supplied to transmit chain 115 (TX1). TX1 includes a BBF 117, a mixer block 118, and a driver amplifier 119. BBF 117 filters out noise due to the digital-to-analog conversion process. Mixer block 118 under control of local oscillator 116 then up-converts the signal into a high frequency signal. Driver amplifier 119 amplifies the high frequency signal to drive antenna 103 so that a high frequency RF signal 105 is transmitted from antenna 103. Mobile communication device 100 switches between receiving and transmitting operation mode. To reduce power consumption, the receivers are normally powered-off in transmitting mode and powered back on in receiving mode.

A common problem in mobile communication device 100 is that the LO signals required for the mixer blocks leak to the front end of each receiver chain due to imperfections or limited isolation between different IC blocks and components. The LO leakages will be mixed with the original LO signals at each mixer block and fall into an unavoidable DC offset voltage for each receiver chain. In MIMO/MISO application, as illustrated in FIG. 2, the LO leakages come from all the local oscillators. For example, the LO signals supplied to mixer 110 leak to the input of LNA 109 of RX1. In addition, the LO signals supplied to receiver chains RX2 and RX3 also leak to the input of LNA 109 of RX1. Although the LO signals generated for transmit chain TX1 also leak to the input of LNA 109 of RX1, the LO leakage from TX1 is less likely to cause any DC offset for RX1 because the LO signal frequency for the transmit chain is, in general, different from the LO signal frequency for the receiver chains. In addition, TX1 is likely to be powered-off during receiving mode. As a result, the final LO leakage level causing DC offset is the vector summation of all the LO leakages from each local oscillator. In addition, because the final LO leakage level is amplified by the LNA in each receiver chain, the DC offset of each receiver chain also depends on the LNA gain setting of each receiver chain.

To receive RF signals properly, the DC offset of each receiver chain needs to be well calibrated. The DC offset can be calibrated by adjusting the input of the BBF in each receiver chain using calibration circuit 113 applied with a proper DC offset calibration (DCOC) code. For example, a first DC voltage of receiver chain RX1 is initially measured at the output of ADC 121 by digital baseband integrated circuit 102. A DCOC code is then selected by digital baseband integrated circuit 102 and applied to calibration circuit 113. Finally, the input of BBF 111 is adjusted by calibration circuit 113 to output a second DC voltage of receiver chain RX1. This process is repeated until the DC voltage of RX1 is calibrated to zero. Such calibration process is time consuming and needs to be repeated for all possible LNA gain settings and for all possible final LO leakage levels.

Typically, the receivers are frequently powered-on in receiving mode and powered-off in transmitting mode, and the final LO leakage level is unpredictable after each power-on of the receivers in receiving mode. It is thus more tedious to calibrate DC offset for MIMO/MISO systems. In one novel aspect, a two-dimensional DCOC table is prepared for each receiver chain. The DCOC table contains DCOC codes for all possible LNA gain settings as well as all possible final LO leakage levels. In addition, phase detection circuit 112 detects the phase relations among different LO signals after each power-on of the receiver chains and thereby helps to determine the final LO leakage level for each receiver chain effectively and efficiently. Based on the determined final LO leakage level and the LNA gain setting, a proper DCOC code can be quickly selected from the DCOC table to calibrate the DC offset for each receiver chain. More details of the DCOC table and the phase detection circuit are now described below with accompanying drawings.

Figure 3:
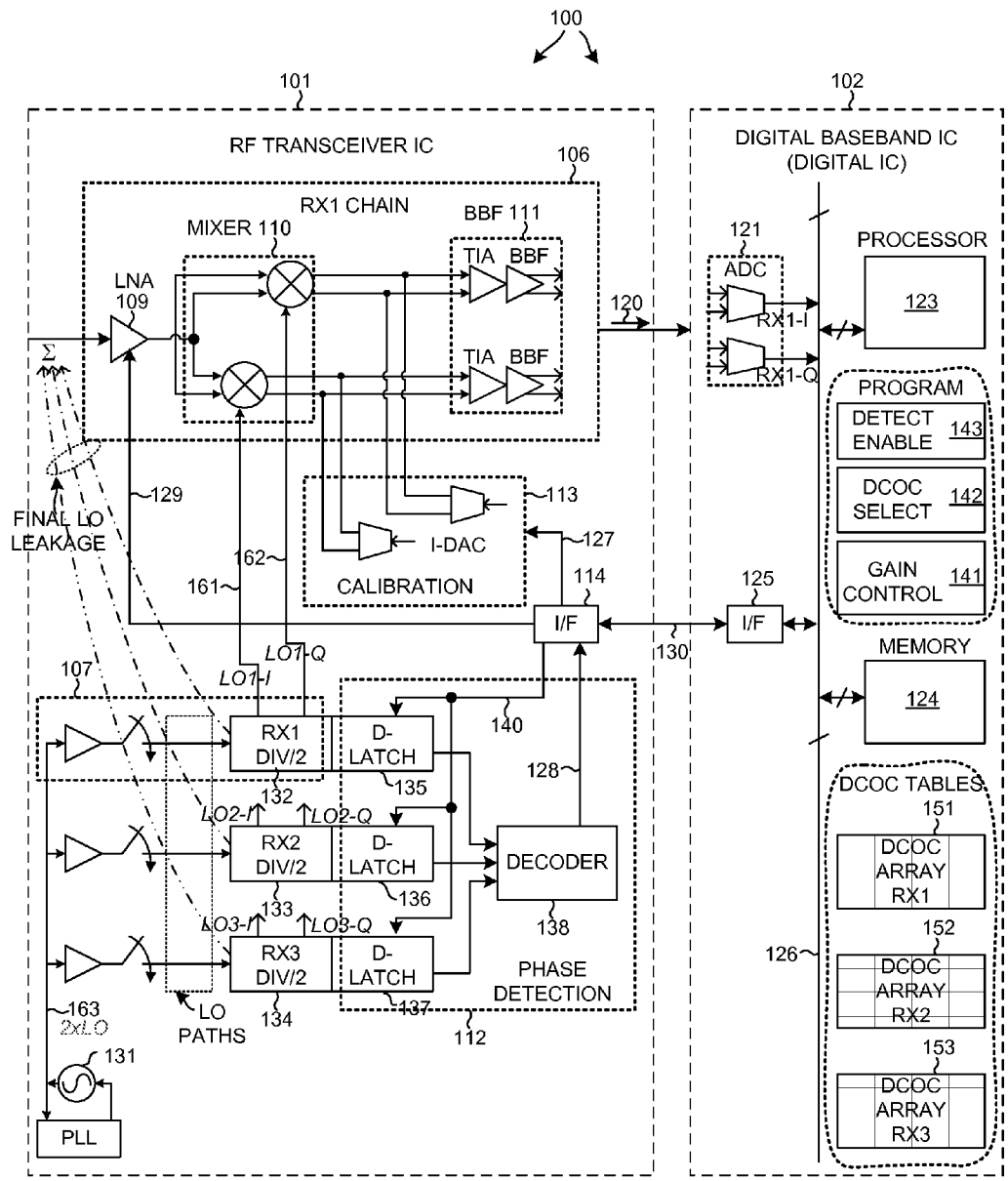
FIG. 3 is a block diagram of one embodiment of a mobile communication device in accordance with one novel aspect.

FIG. 3 is a block diagram of one embodiment of mobile communication device 100 in accordance with one novel aspect. Within RF transceiver integrated circuit 101 of FIG. 3, receiver chain 106 (RX1), local oscillator 107, phase detection circuit 112, and calibration circuit 113 are illustrated with more detail, while receiver chains RX2, RX3, and transmit chain TX1 are omitted from the drawing. Within digital baseband integrated circuit 102 of FIG. 3, memory 124 contains multiple program function blocks as well as multiple DCOC tables. The program function blocks include an LNA gain control block 141, a DCOC code select block 142, and a detect enable block 143. The program function blocks are executable by processor 123 to perform different functionalities. The DCOC tables include three DCOC tables: DCOC table 151 for RX1, DCOC table 152 for RX2, and DCOC table 153 for RX3. Each of the DCOC tables contains DCOC codes of different LNA gain settings and final LO leakage levels for the corresponding receiver chain.

In the example of FIG. 3, RF signals are processed as a pair of FQ signals. Receiver chain 106 thus includes LNA 109, a pair of mixers (depicted as mixer block 110), a pair of transimpedance amplifiers (TIAs), and a pair of BBFs (the TIAs and BBFs are together depicted as BBF block 111) for processing the pair of I/Q signals. The LO signals for multiple receiver chains are provided by a single local oscillator 131 followed by multiple diver-by-2 circuits (I/Q generators). For example, local oscillator 131 generates a 2×LO signal 163, which is applied to a divide-by-2 circuit 132 (for RX1) to generate a first pair of LO signals 161 (LO1-I) and 162 (LO1-Q) for the first receiver chain RX1. LO1-I and LO1-Q have the same frequency but are always 90 degrees out-of-phase in time domain. Similarly, divide-by-2 circuit 133 for RX2 generates a second pair of LO signals LO2-I and LO2-Q for the second receiver chain RX2 (not shown), and divide-by-2 circuit 134 for RX3 generates a third pair of LO signals LO3-I and LO3-Q for the third receiver chain RX3 (not shown).

Take receiver chain RX1 as an example for each I/Q signal. The LO-I and LO-Q signals generated from the three divideby-2 circuits all leak to the input of RX1, and the summation of all the LO leakages result in a final LO leakage level. The final LO leakage level is amplified by LNA 109, mixed with the original LO signals by one of the mixers into a current value, converted by one of the TIAs into a voltage value, and finally filtered by one of the BBFs into a DC offset voltage 120 for RX1. The DC offset voltage for RX1 is then converted into a digital value by ADC 121, such that the DC offset for RX1 can be measured by the digital baseband integrated circuit 102. Therefore, for receiver chain RX1, the DC offset depends on the LNA gain setting as well as the final LO leakage level of RX1. The final LO leakage level of RX1 in turn depends on the amplitude as well as the phase of each LO leakage from the three divide-by-2 circuits. In fact, the final LO leakage level is unpredictable because of the bimodal behavior of the divide-by-2 circuits.

Figure 4:
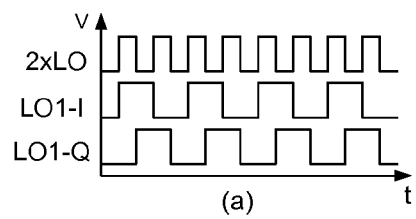
FIG. 4 illustrates bimodal behavior of a divide-by-2 circuit used in an RF receiver of a mobile communication device.
Figure 4:
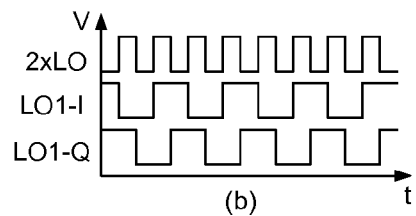

FIG. 4 illustrates the bimodal behavior of divide-by-2 circuit 132 used for receiver chain RX1 in mobile communication device 100. Divide-by-2 circuit 132 for RX1 is frequently powered-on and powered-off when mobile communication device 100 enters receiving mode and transmitting mode. FIG. 4(a) illustrates the waveforms of LO1-I and LO1-Q signals after a first power-on of divide-by-2 circuit 132. This is also referred as the "positive" waveform case. FIG. 4(b) illustrates the waveforms of LO1-I and LO1-Q signals after a second power-on of divide-by-2 circuit 132. This is also referred as the "negative" waveform case. It can be seen that the waveforms of LO1-I and LO1-Q signals between case (a) and case (b) look the same, and that the phases of LO1-I and LO1-Q signals are always in 90 degrees away. The absolute waveforms of LO1-I and LO1-Q signals between case (a) and case (b), however, are bimodal in time domain and are 180 degrees away. In other words, after each power-on, the LO-I and LO-Q signals generated by a divide-by-2 circuit can either have a "positive" waveform or a "negative" waveform. Consequently, the corresponding LO leakages caused by the LO1-I and LO1-Q signals between case (a) and case (b) are also bimodal in time domain and are 180 degrees away. Because of the bimodal behavior of each LO leakage, the final LO leakage level from multiple divide-by-2 circuits can be multi-modal.

Figure 5:
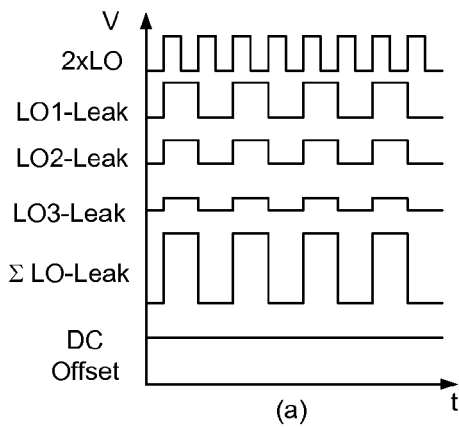
FIG. 5 illustrates LO leakage phase relations and corresponding final LO leakage level and DC offset of an RF receiver in a mobile communication device.
Figure 5:
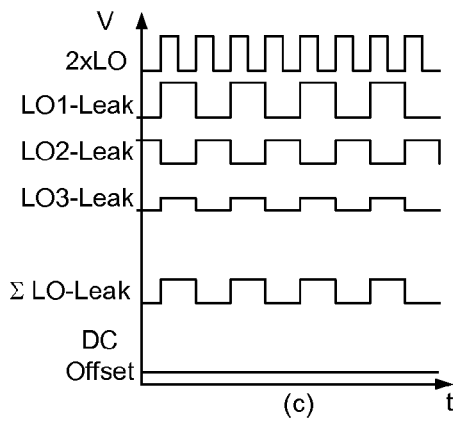
Figure 5:
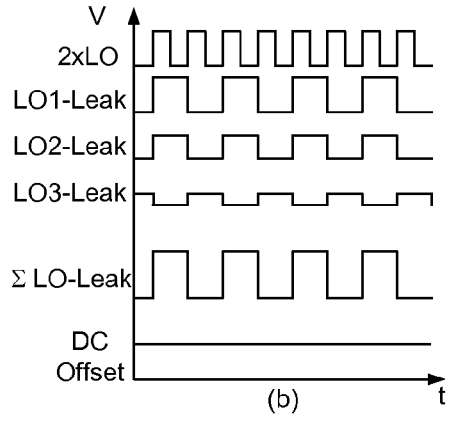
Figure 5:
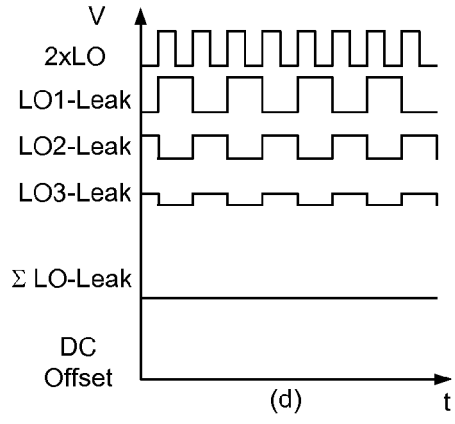

FIG. 5 illustrates LO leakage phase relations, as well as corresponding final LO leakage level (with phase delay ignored) and DC offset voltage of receiver chain RX1 in mobile communication device 100. In the example of FIG. 5, 2×LO represents the waveform of the 2×LO signal generated by local oscillator 131; LO1-Leak represents the waveform of the LO leakage from the first divide-by-2 circuit 132 for RX1; LO2-Leak represents the waveform of the LO leakage from the second divide-by-2 circuit 133 for RX2; and LO3-Leak represents the waveform of the LO leakage from the third divide-by-2 circuit 134 for RX3. The amplitude (i.e., voltage) of each LO leakage depends on the actual circuitry layout. For example, LO1-Leak has large amplitude (A1) because divide-by-2 circuit 132 is located very close to RX1, LO2-Leak has medium amplitude (A2) because divide-by-2 circuit 133 is not located very close to RX1, and LO3-Leak has small amplitude (A3) because divide-by-2 circuit 134 is located far away from RX1. The LO signals, LO leakages, ΣLO-Leak, and the DC offset can be approximately expressed by the following equations (with phase delay ignored in the equations):

$$2\times LO\ signal = \sin(2\omega t) \tag{1}$$

$$LO\ signal = \sin(\omega t) \tag{2}$$

$$LO1\text{-}Leak = A1\sin(\omega t) \tag{3}$$

$$LO2\text{-}Leak = A2\sin(\omega t) \tag{4}$$

$$LO3\text{-}Leak = A3\sin(\omega t) \tag{5}$$

$$\Sigma LO\text{-}Leak = (A1+A2+A3)\sin(\omega t),\ \text{where}\ |A1|>|A2|>|A3| \tag{6}$$

$$DC\ Offset \sim (LNA\ Gain)^*(A1+A2+A3) \tag{7}$$

While the amplitude (A1, A2 and A3) of each LO leakage is fixed based on the circuitry layout, the phase relation among different LO leakages is not fixed because each LO leakage may have either a "positive" waveform or a "negative" waveform in time domain after a different power-on, as illustrated in FIG. 4(a) and FIG. 4(b) respectively. Thus, the final LO leakage level (ΣLO-Leak) for RX1 depends on the amplitudes as well as the phase relations among different LO leakages from each divide-by-2 circuit (see Eq. (6), A1+A2+A3). Consequently, the DC offset for RX1 depends on the LNA gain setting as well as the final LO leakage level (see Eq. (7), LNA gain*(A1+A2+A3)). FIGS. 5 (a), (b), (c), and (d) illustrate four different phase relations among different LO leakages, as well as corresponding final LO leakage level and DC offset of receiver chain RX1.

In FIG. 5(a), all the LO leakages LO1-Leak, LO2-Leak and LO3-Leak have the same phase, which results in the largest final LO leakage level (|A1|+|A2|+|A3|) and a big DC offset voltage. In FIG. 5(b), LO1-Leak and LO2-Leak have the same phase, but LO3-Leak is 180 degrees out-of-phase with LO1-Leak, which results in a smaller final LO leakage level (|A1|+|A2|−|A3|) and a relatively small DC offset voltage. In FIG. 5(c), LO1-Leak and LO3-Leak have the same phase, but LO2-Leak is 180 degrees out-of-phase with LO1-Leak, which results in an even smaller final LO leakage level (|A1|−|A2|+|A3|) and a very small DC offset voltage. Finally, in FIG. 5(d), both LO2-Leak and LO3-Leak are 180 degrees out-of-phase with LO1-Leak, which results in no final LO leakage level (|A1|−|A2|−|A3|=0) and zero DC offset voltage. It can be seen that, under a given LNA gain setting, if there are three (N) divide-by-2 circuits for three (N) receiver chains, then there will be a total of four ($2^{N-1}$) different phase relations among all the LO leakages. As a result, there will be a total of four ($2^{N-1}$) corresponding final LO leakage levels and DC offset voltages.

The DC offset for each receiver chain is calibrated by calibration circuit 113. Referring back to FIG. 3, calibration circuit 113 comprises a pair of I-DACs (for I/Q signals), each converting a digital value to an analog current value. More specifically, DCOC code select block 142 selects a DCOC code (e.g., a digital value range from 0 to 100) and sends the selected DCOC code to calibration circuit 113 across digital bus 130. The pair of I-DACs in calibration circuit 113 each takes the selected DCOC code and outputs a current value. The outputted current value is applied onto the input of one of the TIAs, such that an input voltage to one of the BBFs is adjusted, which results in an adjusted DC voltage at the output of the BBFs. The adjusted DC voltage is then converted into digital form and measured at the output of ADC 121. This calibration process is repeated until the DC offset is calibrated to zero. Because the DC offset depends on the LNA gain setting of each receiver chain as well as the final LO leakage level of each receiver chain, such time-consuming calibration process needs to be repeated for every possible LNA gain setting and every possible final LO leakage level. In one novel aspect, DCOC tables (151, 152, and 153) for each receiver chain are prepared and saved in memory 124 of digital baseband integrated circuit 102. Each DCOC table is a two-dimensional array that includes DCOC codes for all possible LNA gain settings and all possible final LO leakage levels.

FIG. 6 illustrates a DC offset calibration (DCOC) table 151 used for DC offset calibration for receiver chain RX1 in mobile communication device 100. As illustrated in FIG. 6, DCOC table 151 is a two-dimensional array, with each row associated with a possible LNA gain setting for RX1 and each column associated with a possible phase relation among the LO leakages for RX1. Typically, DCOC table 151 can be pre-prepared right after mobile communication device 100 is powered-on. For example, a first phase relation (a) is selected for RX1 by tuning on and off the divide-by-2 circuits, and the DC offset is then calibrated for all possible LNA gain settings G0, G1, G2 and G3. Once a particular DC offset is calibrated for a particular LNA gain setting, its corresponding DCOC code (i.e., DCOC (I/Q) for I/Q signals) is then saved in the corresponding column and row of DCOC table 151. After the first column of phase relation (a) is filled, a second phase relation (b) is selected for RX1 by tuning on and off the divide-by-2 circuits. The same calibration process is then repeated until the entire DCOC table 151 is completed for receiver chain RX1. The same calibration process is also repeated until DCOC tables 152 and 153 are completed for receiver chains RX2 and RX3. Once all the DCOC tables are prepared and saved in memory 124, the DC offset for each receiver chain can be calibrated by calibration circuit 113 without going through the time-consuming calibration process again. This is because ideally, if the LNA gain setting and the phase relation among the LO leakages are known for each receiver chain, then DCOC code select block 142 will be able to select a corresponding DCOC code from a corresponding DCOC table for quick DC offset calibration.

While the LNA gain setting is generally known to DCOC code select block 142, the phase relations among the LO leakages, however, are unpredictable and remain unknown until after the divide-by-2 circuits are powered-on. For example, in time division duplex (TDD) systems, mobile communication device 100 operates in alternating receiving mode and transmitting mode during every superframe/frame. The divide-by-2 circuits for the receiver chains are turned off in transmitting mode and then turned back on in receiving mode to reduce power consumption. Every time the divide-by-2 circuits are turned on, the phase relations among the LO leakages may change to one of the four cases, as illustrated in FIG. 5. Therefore, even with the well-prepared DCOC tables, a proper DCOC code cannot be selected quickly if the phase relation among the LO leakages is unknown. One solution is to never turn off the divide-by-2 circuits for receiver chains, which is undesirable because too much power would be wasted in transmitting mode. Another alternative is to try all different DCOC codes under a given LNA gain setting and then select a corresponding DCOC code with the smallest DC offset. This is also undesirable because the DC offset needs to be quickly calibrated to ensure proper signal reception and processing. It would be very time-consuming to exhaust with all possible phase relations, especially for mobile devices with a large number of receiver chains. For example, if there are 6 receiver chains in a mobile device, then there would be 32 ($2^{6-1}$) different phase relations among the LO leakages. In one novel aspect, phase detection circuit 112 is designed to detect the phase relation among the LO leakages from the divide-by-2 circuits quickly and thereby help to select a proper DCOC code to calibrate the DC offset effectively and efficiently for each receiver chain.

FIG. 7 is a circuit and timing diagram of phase detection circuit 112 used in mobile communication device 100. Phase detection circuit 112 comprises three D-latch circuits 135, 136, and 137. To detect phase relations among the LO signals (and the LO leakages) from multiple divide-by-2 circuits, D-latch circuit 135 receives input signal LO1-I/Q from divide-by-2 circuit 132, D-latch circuit 136 receives input signal LO2-I/Q from divide-by-2 circuit 133, and D-latch circuit 137 receives input signal LO3-I/Q from divide-by-2 circuit 134. In addition, each D-latch circuit receives a detect_enable signal 140 generated by detect enable block 143 and sent across digital bus 130. The detect_enable signal is reset at "a phase detection point," sometime after the divide-by-2 circuits are powered-on. For example, the detect_enable signal is reset during one system clock after an rxlo_enable signal is set, which turns on the divide-by-2 circuits for the receiver chains. Once the detect_enable signal is reset, each D-latch circuit outputs a digital value ("0" or "1") based on the received values of the LO signals at the phase detection point. The digital values of "0" and "1" represent the actual phase of the LO signals. For example, a digital "0" is output if the LO signal has a positive phase (phase (a)), as illustrated in FIG. 4 (a), and a digital "1" is output if the LO signal has negative phase (phase (b)), as illustrated in FIG. 4 (b).

Decoder 138 receives the digital values outputted from the D-latch circuits and, in response, outputs phase detection signal 128. Phase detection signal 128 has four possible values (00, 01, 10, and 11), representing the four possible phase relations among the LO signals (and LO leakages) in a three-receiver mobile communication device. For example, if all three LO signals have the same phase (000 or 111), then phase detection signal 128 has a value of 00, representing the phase relation (a) illustrated in FIG. 5(a). If LO1 and LO2 signals have the same phase, but LO3 is 180 degrees out-of-phase (001 or 110), then phase detection signal 128 has a value of 01, representing the phase relation (b) illustrated in FIG. 5(b). If LO1 and LO3 signals have the same phase, but LO2 is 180 degrees out-of-phase (010 or 101), then phase detection signal 128 has a value of 10, representing the phase relation (c) illustrated in FIG. 5(c). Finally, if LO2 and LO3 signals are both 180 degrees out-of-phase with LO1 signal (011 or 100), then phase detection signal 128 has a value of 11, representing the phase relation (d) illustrated in FIG. 5(d).

After detecting the phase relations among the LO signals (and the LO leakages) for each receiver chain, phase relation signal 128 is sent to DCOC code select block 142 across digital bus 130. DCOC code selection block 142 selects a corresponding DCOC code from a corresponding DCOC table based on the LNA gain setting and the value of the phase detection signal 128. The selected DCOC code is then sent to calibration circuit 113 across digital bus 130 to calibrate the DC offset for each receiver chain. Thus, by using phase detection circuit 112, different phase relations among the LO leakages can be determined very quickly after each power-on of the divide-by-2 circuits. As a result, a proper DCOC code can then be selected for quick DC offset calibration. In addition, phase detection circuit 112 only works when detect_enable signal 140 is set at the phase detection point, and therefore does not result in consistent power consumption.

Figure 8:
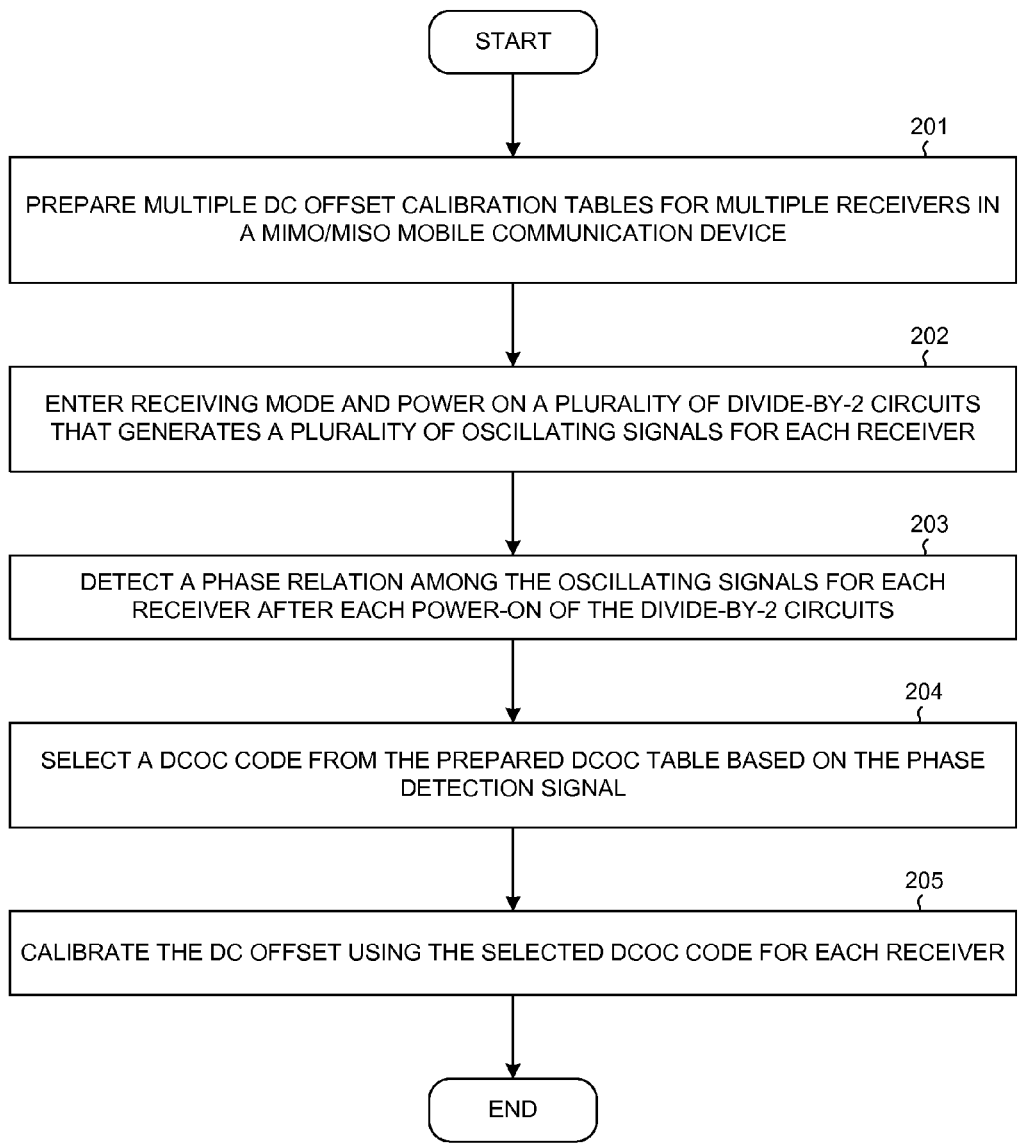
FIG. 8 is a flow chart of a method of calibrating DC offset in a MIMO/MISO mobile communication device in accordance with one novel aspect.

FIG. 8 is a flow chart of a method of calibrating DC offset in a MIMO/MISO mobile communication device in accordance with one novel aspect. The mobile communication device comprises multiple receivers as well as one or more transmitters. Each receiver comprises a receiver chain and a divide-by 2 circuit that supplies LO signals for the receiver chain. The LO signals leak to each receiver chain and create an undesirable DC offset, which needs to be calibrated to ensure proper signal reception and processing. After the mobile communication device is powered up, a DC offset calibration (DCOC) table is prepared to calibrate the DC offset for each receiver chain (step 201). Each DCOC table is a two-dimensional array that contains DCOC codes for different LNA gain settings and different phase relations among the LO leakages for each receiver chain. In step 202, the mobile communication device enters receiving mode and the divide-by-2 circuits are powered-on to supply LO signals for the receiver chains. In step 203, a phase detection circuit detects the phase relation among the LO leakages for each receiver chain and thereby outputs a phase detection signal. In step 204, a DCOC code for each receiver chain is selected from the corresponding DCOC table based on the LNA gain setting and the value of the phase detection signal of each receiver chain. Finally, a calibration circuit calibrates the DC offset for each receiver chain using the selected DCOC code (step 205).

In one or more exemplary embodiments, the functions described may be implemented in hardware, software, firmware, or any combination thereof. If implemented in software, the functions may be stored on or transmitted over as one or more instructions or code on a computer-readable (processor-readable) medium. Computer-readable media include both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that both can be used to carry or store desired program code in the form of instructions or data structures and can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and blue-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. For example, the novel DCOC table illustrated in FIG. 6 and the novel phase relation detector illustrated in FIG. 7 may also be applicable to single-input single-output (SISO) system, which may also have multiple LO leakages generated from its PLL (LO) block. Furthermore, the RF transceiver integrated circuit 101 and the digital baseband integrated circuit 102 illustrated in FIG. 2 may be implemented as a single integrated circuit chip. Accordingly, various modifications, adaptations, and combinations of the various features of the described specific embodiments can be practiced without departing from the scope of the claims that are set forth below.

What is claimed is:

1. A device, comprising:
   a plurality of receivers, wherein each receiver is supplied with an oscillating signal generated by a corresponding oscillator circuit, and wherein each receiver outputs a DC offset voltage caused by leakages from the oscillating signals onto each of the plurality of receivers;
   a phase detection circuit that detects a phase relation among the oscillating signals and thereby outputs a corresponding phase detection signal for each receiver; and
   a calibration circuit that calibrates the DC offset voltage for each receiver based on the corresponding phase detection signal.

2. The device of claim 1, wherein each receiver comprises a low-noise amplifier (LNA), and wherein each oscillating signal leaks from each oscillator circuit to an input of each LNA.

3. The device of claim 1, wherein each oscillator circuit comprises a divider circuit, wherein the divider circuit generates a first oscillating signal waveform after a first power-on and generates a second oscillating signal waveform after a second power-on, and wherein the first oscillating signal waveform and the second oscillating signal waveform are one hundred eighty degrees out-of-phase.

4. The device of claim 3, wherein the divider circuit receives a local oscillating (LO) signal and outputs two oscillating signals that are ninety degrees out-of-phase after each power-on.

5. The device of claim 1, wherein the phase detection circuit comprises a plurality of control logic circuits that receives the oscillating signal and a detect enable signal and in response outputs the phase detection signal.

6. The device of claim 1, further comprising:
   memory that contains a plurality of DC offset calibration tables for each of the plurality of receivers, wherein each DC offset calibration table contains different DC offset calibration codes that are associated with different phase detection values of the phase detection signal.

7. The device of claim 6, wherein the DC offset voltage of each receiver is associated with a low-noise-amplifier (LNA) gain of each receiver, and wherein each DC offset calibration table contains different DC offset calibration codes that are associated with different LNA gains of each receiver.

8. The device of claim 1, wherein the plurality of receivers includes three receivers.

9. A method, comprising:
   powering on a plurality of divider circuits that generates a plurality of corresponding oscillating signals for a plurality of receivers, wherein each of the receivers outputs a DC offset voltage caused by leakages from the plurality of oscillating signals;
   detecting a phase relation among the plurality of oscillating signals and thereby outputting a corresponding phase detection signal for each receiver; and
   calibrating the DC offset voltage of each receiver based on the corresponding phase detection signal.

10. The method of claim 9, wherein each receiver comprises a low-noise amplifier (LNA), and wherein each oscillating signal leaks from each divider circuit to an input of each LNA.

11. The method of claim 9, wherein each divider circuit generates a first oscillating signal waveform after a first power-on and generates a second oscillating signal waveform after a second power-on, and wherein the first oscillating signal waveform and the second oscillating signal waveform are one hundred eighty degrees out-of-phase.

12. The method of claim 9, wherein each divider circuit receives a local oscillating (LO) signal and outputs two oscillating signals that are ninety degrees out-of-phase after each power-on.

13. The method of claim 9, further comprising:
   preparing a plurality of DC offset calibration tables for each of the plurality of receivers, wherein each DC offset calibration table contains different DC offset calibration codes that are associated with different phase detection values of the phase detection signal.

14. The method of claim 13, wherein the calibration involves selecting from a corresponding DC offset calibration table a DC offset calibration code that is associated with a phase detection value of the phase detection signal for each receiver.

15. The method of claim 13, wherein the DC offset voltage of each receiver is associated with a low-noise-amplifier (LNA) gain of each receiver, and wherein the DC offset calibration table contains different DC offset calibration codes that are associated with different LNA gains of each receiver.

16. An apparatus, comprising:
a plurality of receivers, wherein each receiver is supplied with an oscillating signal, and wherein each receiver outputs a DC offset voltage caused by leakages from the oscillating signals onto each of the plurality of receivers; and
means for detecting a phase relation among the oscillating signals and thereby outputting a corresponding phase detection signal for each receiver, wherein the means is also for calibrating the DC offset voltage for each receiver based on the corresponding phase detection signal.

17. The apparatus of claim 16, wherein each receiver comprises a low-noise amplifier (LNA), and wherein each oscillating signal leaks to an input of each LNA.

18. The apparatus of claim 16, wherein the means comprises a two-dimensional DC offset calibration table that contains different DC offset calibration codes that are associated with both different phase detection values of the phase detection signal and different LNA gain settings of each receiver.

19. A non-transitory computer-readable medium storing instructions that, when executed by a processor, cause the processor to perform a method, the method comprising:
powering on a plurality of divider circuits that generates a plurality of corresponding oscillating signals for a plurality of receivers, wherein each of the receivers outputs a DC offset voltage caused by leakages of the plurality of oscillating signals;
detecting a phase relation among the plurality of oscillating signals and thereby outputting a corresponding phase detection signal for each receiver; and
calibrating the DC offset voltage of each receiver based on the corresponding phase detection signal.

20. The non-transitory computer-readable medium of claim 19, wherein each receiver comprises a low-noise amplifier (LNA), and wherein each oscillating signal leaks from each divider circuit to an input of each LNA.

21. The non-transitory computer-readable medium of claim 19, wherein the calibration involves selecting from a two-dimensional DC offset calibration table a DC offset calibration code that is associated with both a phase detection value of the phase detection signal and an LNA gain setting for each receiver.

22. A device, comprising:
a plurality of receivers, wherein each receiver is supplied with an oscillating signal generated by a corresponding oscillator circuit, and wherein each receiver outputs a DC offset voltage caused by leakages from the oscillating signals onto each of the plurality of receivers;
memory that contains a plurality of two-dimensional DC offset calibration arrays for each of the plurality of receivers, wherein each DC offset calibration array contains different DC offset calibration codes that are associated with different phase relations among the oscillating signals; and
a calibration circuit that calibrates the DC offset voltage based on a corresponding DC offset calibration array for each receiver.

23. The device of claim 22, wherein each receiver comprises a low-noise amplifier (LNA), and wherein each DC offset calibration array contains different DC offset calibration codes that are associated with different LNA gain settings.

24. The device of claim 23, further comprising:
a phase detection circuit that detects a phase relation among the oscillating signals and thereby outputs a corresponding phase detection signal for each receiver, wherein the calibration circuit calibrates the DC offset voltage by selecting from the corresponding DC offset calibration array a DC offset calibration code that is associated with both a phase detection value of the phase detection signal and an LNA gain setting for each receiver.

25. A method, comprising:
powering on a plurality of divider circuits that generates a plurality of corresponding oscillating signals for a plurality of receivers, wherein each of the receivers outputs a DC offset voltage caused by leakages from the plurality of oscillating signals;
preparing a plurality of two-dimensional DC offset calibration arrays for each of the plurality of receivers, wherein each DC offset calibration array contains different DC offset calibration codes that are associated with different phase relations among the plurality of oscillating signals; and
calibrating the DC offset voltage of each receiver based on a corresponding DC offset calibration array.

26. The method of claim 25, wherein each receiver comprises a low-noise amplifier (LNA), and wherein each DC offset calibration array contains different DC offset calibration codes that are associated with different LNA gain settings.

27. The method of claim 26, further comprising:
detecting a phase relation among the plurality of oscillating signals and thereby outputting a corresponding phase detection signal for each receiver, wherein the calibration involves selecting from the corresponding DC offset calibration array a DC offset calibration code that is associated with both a phase detection value of the phase detection signal and an LNA gain setting for each receiver.

28. A mobile communication device, comprising:
a plurality of receivers, wherein each receiver is adapted to be supplied with a Local Oscillator (LO) signal generated by a corresponding oscillator circuit;
a phase detection circuit adapted to receive the LO signals generated by the oscillator circuits and in response to output a phase detection signal indicative of a phase relationship of the received LO signals;
a memory that comprises a plurality of Direct Current (DC) offset calibration tables for each of the plurality of receivers, wherein each of the DC offset calibration tables comprises DC offset calibration (DCOC) codes; and
a calibration circuit adapted to receive a DCOC code stored in the memory and to use the DCOC code to calibrate a DC offset voltage for one of the plurality of receivers, wherein the DCOC code is selected based on an Low-Noise Amplifier (LNA) gain setting of the one of the receivers and the phase detection signal.

* * * * *